Sept. 16, 1958     E. H. GAMBLE     2,851,855
FUEL CONTROL SYSTEM FOR JET ENGINES
Filed March 27, 1953     6 Sheets-Sheet 1

FIG. 1

INVENTOR
EDWARD H. GAMBLE
BY
ATTORNEY

Sept. 16, 1958      E. H. GAMBLE      2,851,855
FUEL CONTROL SYSTEM FOR JET ENGINES
Filed March 27, 1953      6 Sheets-Sheet 2

INVENTOR
EDWARD H. GAMBLE
BY
ATTORNEY

Sept. 16, 1958     E. H. GAMBLE     2,851,855
FUEL CONTROL SYSTEM FOR JET ENGINES
Filed March 27, 1953     6 Sheets-Sheet 5

INVENTOR
EDWARD H. GAMBLE
BY *Godfrey B. Spein*
ATTORNEY

United States Patent Office 2,851,855
Patented Sept. 16, 1958

2,851,855

FUEL CONTROL SYSTEM FOR JET ENGINES

Edward H. Gamble, Lancaster, Ohio, assignor to Curtiss-Wright Corporation, a corporation of Delaware Application March 27, 1953, Serial No. 345,007

23 Claims. (Cl. 60—39.28)

This invention relates to control systems for efficiently and automatically regulating within limits the supply of fuel to gas turbines, such as turbo-jet aircraft engines using a liquid fuel. The invention particularly concerns an electronic-electrical-hydraulic control system having fast response to control factors and precise control of the engine's fuel supply so as to maintain engine operation within an optimum range.

The optimum range of operation of a turbo-jet engine depends upon the characteristics of the specific engine. These characteristics define upper limits beyond which "surge" may occur, and lower limits below which the efficiency of the engine decreases materially. A conventional turbo-jet aircraft engine comprises an air intake and compressor, a combustion space into which liquid fuel is injected and mixed with air (which is in excess of combustion requirements) from the compressor and a turbine that is operated by the highly heated combustion gases for in turn driving the compressor. The hot exhaust blast from the turbine constitutes the reaction jet for producing useful thrust for propelling the aircraft.

The "surge" condition above referred to is a phenomenon involving the compressor operation. When the compressor speed is relatively low and the velocity of the air entering the compressor is too low for the rotational speed of the compressor blades, the angle of attack of the blades becomes too great, aerodynamic flow is interrupted and a "stall" condition occurs in one or more stages of the compressor, due to rotating regions of low air density and characterized by variations in the amplitude of fluctuation in a radial direction. "Surge" is considered as low frequency air fluctuations which occur generally throughout the compressor when rotating at high speed, characterized by stall over the full length of the compressor blades. Both surge and stall, however they are defined, interfere with compressor efficiency and both result in pressure fluctuations. The terms "surge" and "stall" are used herein more or less interchangeably and are intended to comprehend phenomena of compressor operation which result in fluctuating flow and pressure conditions within the compressor. This combination of "stall" conditions in the compressor stages may be accompanied by rapid thermodynamic phenomena involving reversal of air flow through the compressor with accompanying severe mechanical stresses and possible breaking up of parts of the compressor. This often results in considerable damage to the engine.

A principal object of the present invention therefore is to provide improved computing and control means for controlling the operation of a gas turbine of the character in question through calculated and precise control of the fuel supply so that optimum operation of the engine is automatically maintained.

Another object of the invention is to provide an improved electronic-electrical-hydraulic control system for the fuel supply of aircraft engines of the gas turbine type that is efficient and fast in operation for scheduling proper fuel flow under all flight and operating conditions, and that involves components of small mass as compared with components of conventional mechanical-hydraulic fuel control systems so that the system is particularly well-suited for airborne operation.

In accordance with the present invention the operation of the throttle by the operator or pilot is modified in accordance with certain primary control factors such as ram pressure ratio, compressor inlet temperature, compressor discharge pressure, turbine inlet temperature and also where preferred, "surge" pressure indications, so as to schedule the fuel supply or flow for optimum operation of the engine within a range precluding "surge" conditions.

The invention will be more fully set forth in the following description referring to the accompanying drawings, and the features of novelty will be pointed out with particularity in the claims annexed to and forming a part of this specification.

Referring to the drawings.

Figure 1:
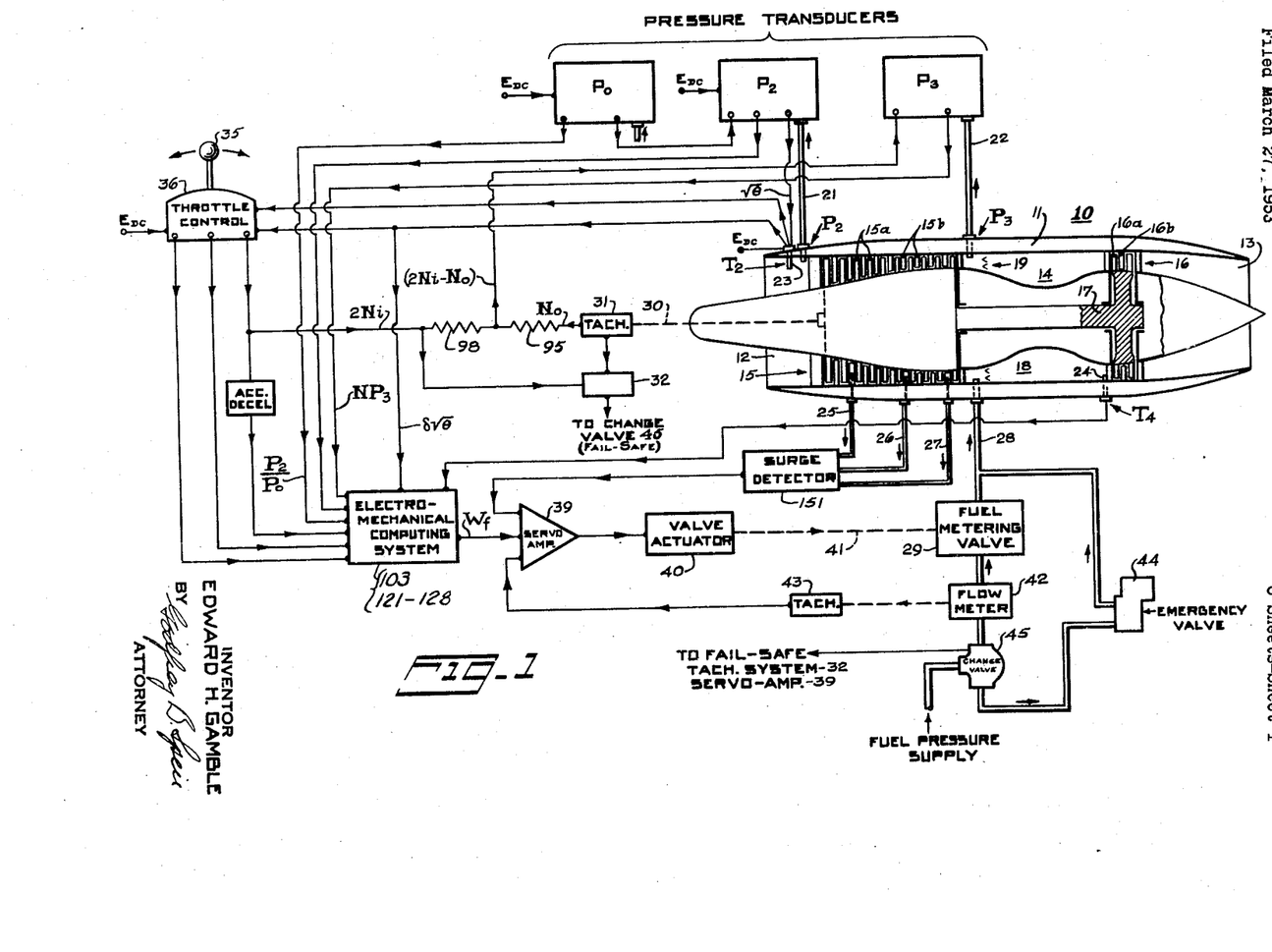
Fig. 1 is a general schematic illustration of the fuel flow control system of the present invention in relation to a turbo-jet aircraft engine.

Referring first to Figure 1, the control system embodying the present invention is shown in general block diagrammatic and schematic form in relation to a turbo-jet aircraft engine of the "single-spool" type indicated at 10. The engine per se constitutes no part of the present invention and may comprise a casing 11 having an air intake opening 12 and an exhaust opening 13 for the highly heated combustion gases constituting the reaction jet. Within the casing 11 a compressor-turbine assembly 14 is mounted for rotation about its longitudinal axis, the compressor 15 being located at the air intake 12 and having movable and stationary blades 15a and 15b, respectively, and the turbine 16 being located forward of the exhaust 13 and having movable and stationary blades 16a and 16b, respectively. The compressor and turbine are mounted for rotation on a common shaft 17 as indicated so that the turbine, which is operated by the highly heated gases produced in the combustion space 18, drives the compressor for supplying air to the combustion space as well known in the art. Suitable burner apparatus in the combustion space is generally indicated at 19.

The control system is connected to the engine through a speed pick-off and a plurality of pressure and temperature pick-offs as indicated. The compressor inlet and discharge pressures are communicated by pressure lines 21 and 22 to pressure transducers indicated at $P_2$ and $P_3$, respectively. Temperature pick-offs constituting probes 23 and 24 of the resistance type are indicated at $T_2$ and $T_4$ for detecting temperature changes at the compressor inlet and turbine inlet, respectively. Additional pressure pick-offs at a plurality of stages of the compressor are indicated at 25, 26 and 27 for energizing surge detector apparatus as will be hereinafter described. These surge pressure pick-offs may communicate with passages through the stationary blades of the respective compressor stages as indicated whereby the pressure at the face of a stationary blade is transmitted to the surge detector. For providing a speed pick-off the shaft of the compressor-turbine combination is suitably connected as indicated at 30 to an electric tachometer 31 or the like for generating a signal $N_o$ representing the R. P. M. of the turbine assembly. A fail-safe system is indicated at 32 for controlling fuel flow change-over in cases of failure of the $N_o$ signal.

The turbine is connected as indicated to a fuel supply line 28 that is in turn connected to a fuel pressure supply through a fuel metering valve 29, the operation of which is responsive to the control system of the present invention.

The control system is of the electronic-electrohydraulic type and it will be sufficient for the purposes of Figure 1 to describe the pressure transducers $P_0$, $P_2$ and $P_3$ as voltage deriving means responsive respectively to ambient pressure, compressor inlet pressure and total compressor discharge pressure. The throttle control 35 operable by the pilot is effective to operate additional voltage deriving means generally indicated at 36, this deriving means being energized in part by pressure-temperature derived voltages from the temperature pick-off $T_2$ and pressure transducer system as indicated, for in turn producing voltages for the computer system. The pressure transducers operate to combine and modify pressure and temperature voltages as hereinafter described for producing in addition to energizing voltages for the throttle deriving means, additional control voltages for the computer system.

As indicated, potential from the throttle control deriving means representing throttle setting or desired turbine R. P. M. ($N_i$) is compared with the tachometer potential representing actual turbine R. P. M. ($N_o$) so that the difference potential ($N_i - N_o$) representing R. P. M. error is transmitted to the pressure transducer $P_3$ in the form N which equals ($2N_i - N_o$). This potential is modified according to the compressor discharge pressure and is used as a basic control quantity $NP_3$ for the computer system (103 and 121-128) as more fully described in connection with Fig. 2. The $N_i$ and $N_o$ signals also control the fail-safe system 32 described in connection with Fig. 9 for operating the fuel change valve 45. Another control factor involves the acceleration-deceleration limiter which serves to retard transmission of the throttle signal according to engine characteristics as hereinafter described.

The computer system in turn produces a control quantity or potential representing fuel quantity (pounds per hour) for energizing a servo amplifier 39, the output of which controls the valve actuator or motor 40 for operating through a mechanical connection 41 the fuel metering valve 29. A feed-back connection is provided from the fuel line to the servo amplifier 39 and comprises a turbine-type flow meter 42 operating an electric tachometer 43 for generating a signal representing fuel flow in pounds per hour. Suitable emergency and fail-safe means are indicated whereby the fuel metering valve 29 may be by-passed through an emergency fuel valve 44 that is subject to mechanical control by the throttle and emergency R. P. M. governor as known in the art. A change or transfer valve 45 of the solenoid operated type is connected in the fuel line as indicated so as to transfer fuel either to the metering or emergency valve as required. This may be in response to computer failure, such as failure of the R. P. M. tachometer 31, power servo amplifier, etc.

The fuel supply schedule is based on a calculated fuel metering function that is arrived at by analysis of characteristic data and charts of the specific engine (in the present instance, a high-power, turbo-jet aircraft engine) that is to be controlled. The fuel metering function utilizes the major independent parameters involved and provides for a functional characteristic that is comparatively non-linear. In particular, the fuel flow factor $$\frac{W_f}{\delta\sqrt{\theta}}$$

is expressed as a function of $$\frac{NP_3}{\delta\sqrt{\theta}}$$

where $W_f$ = Actual fuel flow in lbs./hr.
$N$ = Engine speed—R. P. M. ($2N_i - N_o$)
$P_3$ = Total compressor discharge pressure in in. Hg. (abs.)
$\theta$ = Compressor inlet temperature in ° R./518.4° R.
$\delta$ = Compressor inlet pressure in in. Hg (abs.)/29.92 in. Hg In addition to correcting fuel supply according to engine characteristics, there is an additional correction based on ram pressure ratio $$\frac{P_2}{P_0}$$

where:

$P_2$ = Compressor inlet pressure—in. Hg abs.
$P_0$ = Ambient pressure—in. Hg abs.

Figure 4:
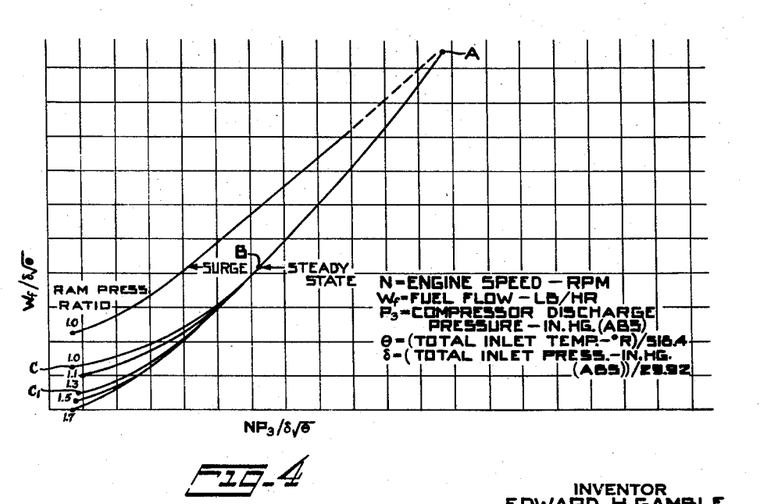
Fig. 4 is a chart showing characteristic curves of a fuel metering function of a turbo-jet engine, particularly with reference to varying ram pressure ratio.

A graphical illustration of this functional relationship involving actual fuel flow $W_f$ and showing the effects of ram pressure ratio is presented by Fig. 4 which is believed to be self explanatory. The factor $\delta\sqrt{\theta}$ appears in connection with both fuel flow ($W_f$) and turbine R. P. M. (N) since it is not possible to multiply both the ordinate and abscissa values by $\delta\sqrt{\theta}$ for functional simplification because of the large error which would exist in the desired factor represented by the ordinate intercept. By way of explanation, a generally similar chart may be constructed incorporating the same functional relationships for each individual design of turbo-jet engine of the single-spool type.

Figure 3:
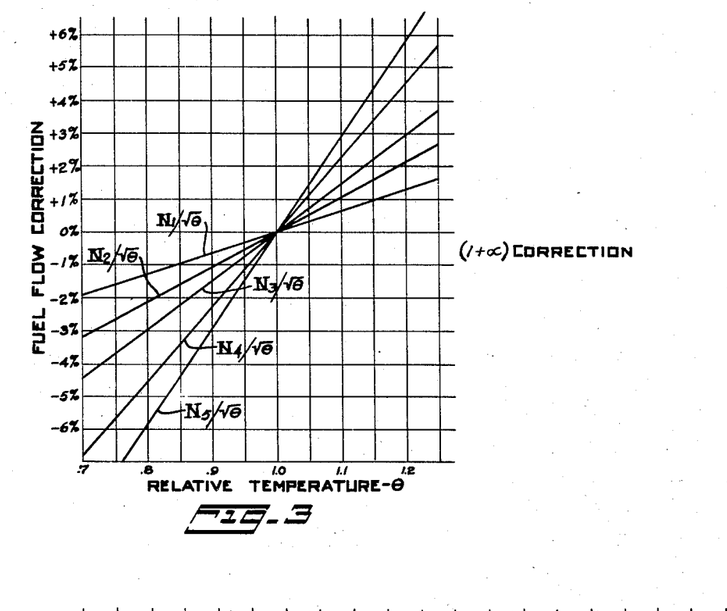
Fig. 3 is a chart of characteristic curves of a turbo-jet engine with reference to fuel flow correction.

The fuel flow factor functional relationship described above neglects correction factors which vary with relative temperature and engine speed. This correction may be referred to as the fuel flow correction and a representative graphical illustration for this is shown by Fig. 3, which is also self explanatory.

Mathematical analysis of this characteristic data shows that the correction factor which may be designated by the symbol $(1+\alpha)$, serving as a multiplying factor upon $W_f$, can be represented by the expression:

$$1 + N\left(1 - \frac{1}{\theta}\right)$$

The significance of this computed factor in controlling the fuel metering function will be described in connection with the electrical system shown by Fig. 2.

Figure 2:
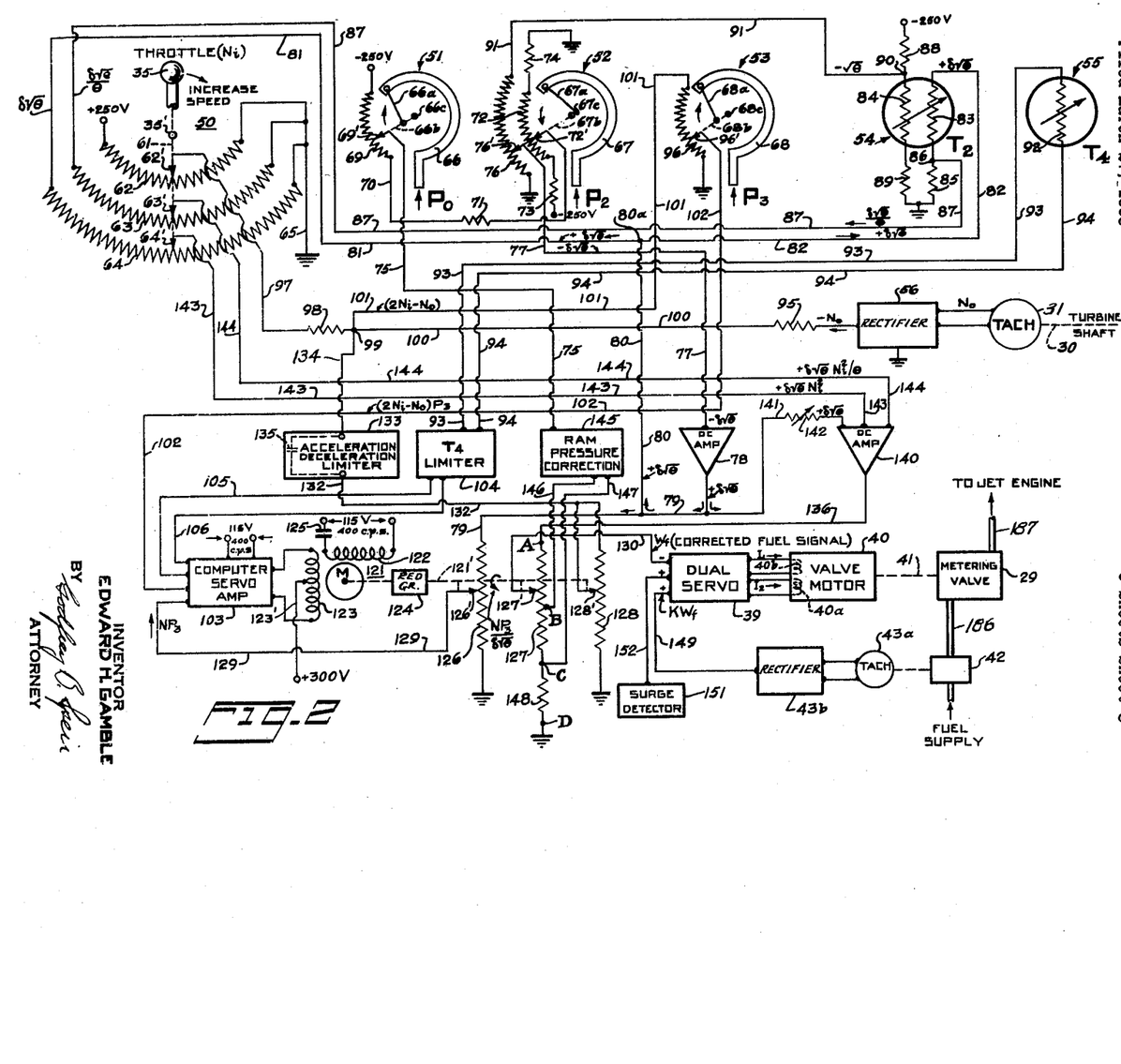
Fig. 2 is a diagram of the electrical fuel control system, partly schematic, illustrating the general relationship and inter-connections of the various electrical, electronic, mechanical and hydraulic components of the system.

Referring to Fig. 2, the primary control components for the computer network comprise a throttle potentiometer assembly generally indicated at 50, three pressure transducers generally indicated at 51, 52 and 53 which are responsive respectively to ambient pressure $P_0$, compressor inlet pressure $P_2$ and compressor discharge pressure $P_3$ as described in connection with Fig. 1, and two temperature probes of the variable resistance type indicated generally at 54 and 55 and responsive respectively to the compressor inlet temperature $T_2$ and the turbine inlet temperature $T_4$. In connection with the temperature probe 55, the temperature response for control purposes in the case of a single-spool turbo-jet engine may be according to either turbine-inlet temperature $T_4$ or turbine discharge temperature $T_5$ since in this case there is substantially a linear relationship between $T_4$ and $T_5$. However, for a double-spool type turbo-jet engine this relationship may no longer hold and temperature pick-off at the turbine inlet is required. There is also included in the primary controls an electrical tachometer 31 that is driven from the turbine shaft (as indicated in Fig. 1) for producing an electrical A. C. voltage that is rectified at 56 to give the signal $N_0$ representing the speed or R. P. M. of the turbine.

Referring specifically to the throttle potentiometer assembly 50, a throttle control lever 35 which is subject to manual control by the pilot is mechanically connected as indicated at 61 to the brush or slider contacts 62', 63', and 64' of three potentiometers, 62, 63 and 64 respectively. As indicated, the slider contacts are operable as a unit according to displacement of the throttle control lever. The potentiometer 62 is of the linear type so that the voltage derived from this potentiometer representing $N_i$ bears a linear relationship to throttle displacement. The potentiometers 63 and 64 are non-linear in design and produce a change in potentiometer resistance corresponding to the square of the throttle displacement. The voltage derived from the first potentiometer 62 is used for comparison with the tachometer voltage signal above referred to for basic control purposes and the voltages derived from the non-linear potentiometers 63 and 64 are used for determining the fuel flow correction voltage as hereinafter described.

The energizing voltages for the throttle potentiometers include a fixed D. C. voltage (+250 v.) for the linear potentiometer 62 and pressure-temperature function D. C. voltages representing $\delta\sqrt{\theta}/\theta$ and $\delta\sqrt{\theta}$ respectively for the non-linear potentiometers 63 and 64. The potentiometers have a common ground connection at the terminals which represent retarded throttle position as indicated at 65.

The three pressure transducers 51, 52 and 53 are shown as comprising Bourdon tubes 66, 67 and 68 that are responsive to the respective pressures as indicated. Where desired, pressure actuated bellows may also be used for obtaining a wider pressure range, as for example in the case of the $P_3$ pressure transducer. Each Bourdon tube or pressure responsive device is mechanically connected, as in the case of the $P_0$ transducer 51, to a slider contact or contacts through a link 66a and connected rotatable arm 66b, pivotally mounted at 66c. The operating linkages of the transducers 52 and 53 are similarly indicated. The $P_0$ transducer 51 controls the slider 69' of the potentiometer 69 which is designed to provide a linear change of potentiometer resistance for a linear pressure differential. This is likewise true of the potentiometers of the $P_2$ and $P_3$ transducers.

The $P_0$ potentiometer 69 is energized at its upper terminal (as viewed) by a negative D. C. reference voltage (−250 v.) and its lower terminal is connected through conductor 70 and resistance 71 to the slider 72' of the $P_2$ potentiometer 72. This last-named potentiometer in turn has its lower terminal connected to the aforesaid D. C. reference voltage −250 v. through a resistance 73, and its upper terminal is connected to ground through a resistance 74. Accordingly, the voltage derived from the $P_0$ potentiometer 69 which is in turn energized by the derived voltage from $P_2$ potentiometer 72 may represent, by reason of the dividing relationship of the two potentiometers, the ram pressure ratio $$\frac{P_2}{P_0}$$

This ram pressure ratio voltage is fed by conductor 75 to a ram pressure correction circuit, Fig. 6, for controlling the fuel metering function as hereinafter described.

A second potentiometer 76 in also controlled by the $P_2$ transducer which operates the slider contact 76'. The upper terminal of this potentiometer is energized by a negtaive D. C. temperature function voltage representing $-\sqrt{\theta}$ which is derived as presently described from resistance circuits of the $T_2$ temperature probe 54. The lower terminal of potentiometer 76 is grounded so that the derived voltage at slider 76' represents the product of compressor inlet pressure and $-\sqrt{\theta}$, namely $-\delta\sqrt{\theta}$. This function voltage is led by conductor 77 to a D. C. unity gain feedback amplifier generally indicated at 78, the output voltage $+\delta\sqrt{\theta}$ being reversed in polarity as indicated. This output voltage is connected by conductors 79 and 80 to two branch conductors 81 and 82, the conductor 81 for energizing the throttle potentiometer 64, and the conductor 82 for energizing a branch circuit including resistance 83 of the $T_2$ temperature probe. The amplifier output voltage $+\delta\sqrt{\theta}$ is also used for other purposes described later.

There are two $T_2$ temperature probes comprising two resistances 83 and 84 respectively, linearly variable with $\theta$ temperature change. The resistance 83 which is connected at its upper terminal to the pressure-temperature function voltage $+\delta\sqrt{\theta}$ is connected at its lower terminal to ground through a series resistance 85. A tap-off connection is made from this branch circuit is made at 86 for deriving a voltage representing $\delta\sqrt{\theta}/\theta$, this value being obtained by judicious selection of the values of resistances 83 and 85. This derived voltage is led by conductor 87 to the throttle potentiometer 63.

The other $T_2$ linearly variable resistance 84 is connected at its upper terminal to a negative D. C. voltage (−250 v.) through a resistance 88 and at its lower terminal to ground thru a resistance 89. A tap-off connection is made at 90 for deriving a temperature function voltage $-\sqrt{\theta}$, this relationship being obtained also by a judicious selection of the resistances, 88, 84 and 89. This derived voltage is fed by conductor 91 to the upper terminal of the $P_2$ potentiometer 76 above referred for producing the pressure-temperature function voltage $-\delta\sqrt{\theta}$.

The $T_4$ temperature probe 55 comprises a single resistance 92, linearly variable with turbine inlet temperature, for controlling a so-called "$T_4$ limiter" circuit for in turn limiting the output of the control system so that damage to the engine is prevented in case of excessively high turbine-inlet temperatures. The $T_4$ resistance is connected by conductors 93 and 94 to the $T_4$ limiter which will be subsequently described in connection with Fig. 5. Both the $T_2$ and $T_4$ temperature probes are designed to provide comparatively large linear variation of resistance with temperature and for obtaining minimum time delay in respect to a differential temperautre change.

The $P_3$ transducer 53 includes a potentiometer 96, the upper terminal of which is energized by the difference voltage resulting from comparison of the voltages from the throttle potentiometer 62 and the turbine R. P. M. tachometer 56 above referred to. For purposes of computation the voltage derived at the slider 62' of the linear throttle potentiometer 62 represents $2N_i$. This voltage is connected through conductor 97 and resistance 98 to a junction 99. The rectified D. C. voltage from the tachometer represented as $-N_0$ also is connected to junction 99 through a resistance 95 and conductor 100. Accordingly the algebraic summation of the voltages across resistances 98 and 95 respectively, appears at junction 99 and represents the R. P. M. error or difference voltage $2N_i-N_o$. This voltage is fed by conductor 101 to the $P_3$ potentiometer 96 above referred so that the derived voltage at slider 96' represents the product of the difference voltage and a function of compressor discharge pressure, i. e., $(2N_i-N_o) P_3$. This voltage is fed by conductor 102 to the input side of the computer servo amplifier 103. For the condition where $N_i$ approaches $N_o$, an average value N may represent $(2N_i-N_o)$ and the above expression may be simplified as $NP_3$. As above pointed out this voltage $NP_3$ is a basic control quantity for regulating the supply of fuel to the turbine-jet engine.

The tachometer 31 for generating the turbine R. P. M. signal $N_o$ may comprise a well-known A. C. tachometer that is designed to provide a variable frequency output linear with the input speed, together with a linear relationship between the output amplitude and the output frequency. Deviation of the output from this linear relationship as a function of ambient temperature is compensated in known manner by using a correction factor obtained by a non-linear resistance element in the tachometer circuit. As specifically shown, the output of the tachometer is electrically rectified at 56 so that the characteristic $N_o$ signal is a negative D. C. voltage that is linear with the speed of the turbine. Other tachometer arrangements may be used to provide the desired output signal.

Referring again to the inputs for the computer servo amplifier 103, there is applied whenever the turbine-inlet temperature reaches a dangerous limit a limiting control voltage from the $T_4$ limiter generally indicated at 104, in addition to the basic control voltage $NP_3$. This signal is obtained by providing means for limiting the $NP_3$ voltage, in the present case by shunting resistance to ground through the operation of relay circuits in the $T_4$ limiter circuits, Fig. 5, where a relay circuit is actuated according to a predetermined high resistance of the $T_4$ probe.

Figure 5:
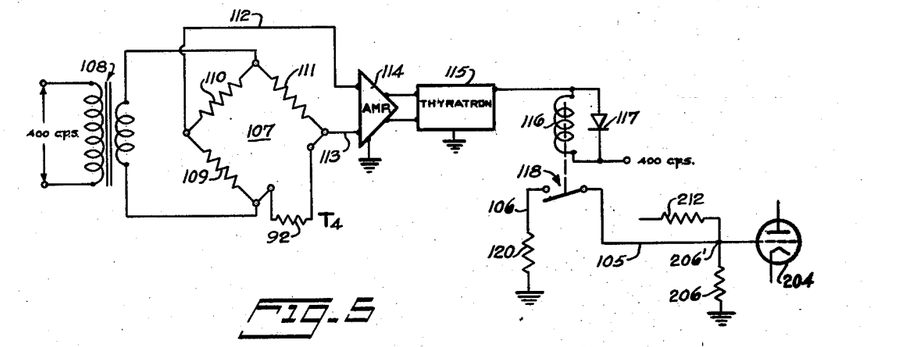
Fig. 5 is a circuit diagram illustrating the function of the $T_4$ or turbine temperature limiter.

Referring to Fig. 5, the Wheatstone bridge 107 is energized as indicated from the 400 C. P. S. voltage supply through a transformer 108. Three arms of the bridge include resistances 109, 110 and 111 and the fourth arm of the bridge includes resistance 92 of the $T_4$ probe. The bridge is so designed that the degree of unbalance depends upon predetermined increase of the resistance 92. The output terminals of the bridge are connected by conductors 112 and 113 to an A. C. amplifier 114, the output of which is connected in known manner to the control grid of a thyratron 115 so that the thyratron is fired in accordance with a predetermined signal from the amplifier. The output circuit of the thyratron includes a relay coil 116 connected in parallel with a rectifier 117 and to the 400 C. P. S. supply whereby firing of the thyratron energizes the relay coil causing closing of the relay contacts at 118. This completes a shunt circuit across the grid bias resistance 206 which is part of the computer servo amplifier 103. The shunt circuit includes a conductor 105 connected to the upper terminal 206' of resistance 206, relay contacts 118 and a grounded resistance 120, through conductor 106 the resistance 206 also being grounded as indicated. Shunting of the grid bias resistance by this circuit reduces the input signal on the grid of the servo amplifier tube 204 of the amplifier 103 thereby reducing the output of the servo amplifier and consequently reducing the turbine fuel supply.

The computer servo amplifier 103 provides a direct line of transmission through the amplifier for producing a 400 C. P. S. output at an amplitude that is linearly proportional to the amplitude of the D. C. input signal. The amplifier also provides for a second input feedback signal for closed-loop servo operation. The computer servo amplifier therefore provides push-pull output current at 400 C. P. S. operating the servo motor generally indicated at 121. This motor is of the two-phase type and comprises a fixed phase or reference winding 122 energized from the 400 C. P. S. supply and a control winding 123 energized by the output current of the computer servo amplifier. A center tap connection 123' connects the winding 123 to a D. C. supply (+300 v.) for increasing the sensitivity response of the motor as later described. The winding 122 may be connected in series with a condenser 125 or suitable phase shifting device so that the currents in the coils 122 and 123 are de-phased by 90°. The operation of this type of motor is well known in the art, the direction of rotation reversing in accordance with reversal of phase in the control winding 123 and the motor speed depending on the magnitude of the control current. The servo motor is designed for low inertia of the rotor and low time constant.

The servo motor 121 is mechanically connected to the slider contacts of a potentiometer assembly through suitable gear reduction means generally indicated at 124. The connection to the slider contacts comprises a rotatable shaft diagrammatically indicated at 121' for rotating each slider contact with respect to a circular potentiometer of the wound card type. For purposes of illustration the individual potentiometers 126, 127 and 128 are shown schematically as developed in a plane with the slider contacts 126', 127', and 128' arranged for reciprocal movement along the respective resistances. A form of potentiometer assembly wherein a plurality of wound card potentiometers are engaged by the respective sliders that are mounted on a driven shaft positioned concentrically of the potentiometers is shown for example by Patent No. 2,431,749, issued December 2, 1947, to R. B. Grant for "Potentiometer Housing and Positioning Structure."

The potentiometer 126 has a linear voltage characteristic with displacement of the slider, the derived voltage at slider 126' being connected by conductor 129 to the computer servo amplifier 103 as a feedback input signal. This potentiometer is energized at its upper terminal by the function voltage $+\delta\sqrt{\theta}$ which is fed from the D. C. amplifier 78 to the potentiometer by conductor 79 and the lower terminal of the potentiometer is grounded. The derived feedback voltage will be equal in magnitude to the main servo amplifier input $NP_3$ when the computer servo is stabilized, i. e. the turbine is in a steady-state condition. It will, therefore, be noted that by reason of the aforesaid feedback control the computer servo system functions as a dividing servo wherein the servo shaft angle may be represented as $$\frac{NP_3}{\delta\sqrt{\theta}}$$

The other two potentiometers 127 and 128 of the assembly have non-linear characteristics, the potentiometer 127 serving as a fuel metering function potentiometer whose derived voltage, as functions of slider displacement and the signal level at the upper terminal of the potentiometer, constitutes the signal voltage which represents the corrected fuel flow ($W_f$) for energizing the valve servo amplifier generally indicated at 39. The potentiometer 128 serves as a variable resistance for the acceleration-deceleration circuits, the lower terminal of the potentiometer being connected to ground and the upper terminal being connected both to the slider 128' and a conductor 132 that is connected to suitable time-delay circuits indicated as the "aceleration-deceleration limiter" at 133. This circuitry is connected by conductor 134 to the junction 99 so as to be energized by the R. P. M. difference voltage $(2N_i-N_o)$. The time delay circuit is shown in the interest of simplicity as comprising a branch circuit from junction 99 to ground, this circuit including a capacitance 135 and a series-connected variable resistance at the grounded potentiometer 128 which is varied by the position of the slider 128'. Accordingly, the difference-voltage signal $(2N_i-N_o)$ from junction 99 is subject to a time delay as it is fed to the $P_3$ transducer, depending in general on the amount of fuel required, i. e. maximum fuel corresponds to maximum time delay.

Referring to the fuel metering function potentiometer 127, the upper terminal thereof is energized through conductor 136 from the output of the D. C. amplifier 140 by a voltage representing the corrected maximum fuel metering function signal, namely $\delta\sqrt{\theta}\,(1+\alpha)$, where $$\alpha = \text{constant} \cdot N_i^2\left(1 - \frac{1}{\theta}\right)$$

This signal voltage represents the summation of three D. C. input voltages for the summing amplifier as presently identified.

The D. C. summing amplifiers 140 and 78 may be of known design and provide for reversal of output voltage polarity with respect to the input signal which in turn may be a summation of two or more electrical signals. These amplifiers also use positive regenerative feedback directly on the input grids in the presence of an input signal level permitting zero-setting for D. C. drift.

Referring again to the D. C. summing amplifier 140, a first signal input comprises a voltage $+\delta\sqrt{\theta}$ from the output of D. C. amplifier 78 through conductor 141 and variable resistance 142, the resistance being adjustable for varying the signal level. The other two input voltages representing $+\delta\sqrt{\theta}\,N_i^2$ and $$+\delta\sqrt{\theta}\frac{N_i^2}{\theta}$$

are derived at the sliders 64' and 63' of the respective throttle potentiometers 64 and 63 and are connected to the amplifier input by conductors 143 and 144 respectively. For computing purposes the signal on conductor 144 is connected to an inner grid in the amplifier circuit for reversing the signal polarity so that the signal is in effect $$-\delta\sqrt{\theta}\frac{N_i^2}{\theta}$$

For a description of the computing function of the summing amplifier 140, reference is again made to the engine characteristic chart of Fig. 3 illustrating fuel flow correction function, herein designated as $(1+\alpha)$ correction. Referring now to Fig. 3 it will be noted that the characteristic temperature-fuel correction curves intersect at a point designated unity along the abscissa representing relative temperature $\theta$ and the ordinate representing percent correction. Accordingly, the correction factor may be measured in either direction from this point.

By analysis a close approximation of the correction curves of Fig. 3 has been found to be:

$$1 + N_i^2\left(1 - \frac{1}{\theta}\right) = \alpha + 1$$

wherein $N_i = N$ times a constant.

Referring now to the inputs for the summing amplifier 140 the summation thereof can be represented as follows:

$$+\delta\sqrt{\theta} - \frac{\theta N_i^2}{\theta} + \delta\sqrt{\theta}N_i^2 = \delta\sqrt{\theta}\left[1 + N_i^2\left(1 - \frac{1}{\theta}\right)\right]$$

since by definition $$N_i^2\left(1 - \frac{1}{\theta}\right) = \alpha$$

then $\delta\sqrt{\theta}\,(1+\alpha)=$ output of D. C. summing amplifier 140.

The position of shaft 121' is a function of $$\frac{NP_3}{\delta\sqrt{\theta}}$$

or uncorrected fuel flow. This value is converted to $W_f$ (corrected) by the use of potentiometer 127 as a multiplying device, whereby the function $\delta\sqrt{\theta}\,(1+\alpha)$ is multipled by $$\frac{NP_3}{\delta\sqrt{\theta}}$$

to produce $W_f$ (corrected) $= NP_3(1+\alpha)$ on the potentiometer slider 127' and the lead 130.

Accordingly it will be seen that the energizing voltage for the fuel metering function potentiometer 127 is adjusted according to the fuel flow correction factor chart of Fig. 3, and the derived voltage at slider 127' of this potentiometer represents the corrected fuel signal $W_f$, subject however to the ram pressure correction for comparatively low values of $NP_3$ as will be presently described in connection with Figs. 3 and 6. As generally indicated by Fig. 2, the metering function potentiometer 127 is also used to obtain the ram pressure correction, graphically indicated in Fig. 4. The means for determining ram pressure correction generally indicated at 145 is energized by a voltage $$\frac{P_2}{P_0}$$

representing ram pressure ration from the $P_0$ transducer (conductor 75). The output of the correction circuits 145 is connected by conductors 146 and 147 to the tap B and lower terminal C respectively of the metering potentiometer 127. The upper terminal A is energized by the maximum fuel-corrected signal above described and the lower terminal C is connected to ground at D through a resistance 148. It will therefore be noted that the ram pressure correction is effective within the potentiometer range B-C which referring to Fig. 4, represents operation in the lower range of the characteristic curves where variation in $$\frac{P_2}{P_0}$$

causes large deviations from the unity ratio curve.

Figure 6:
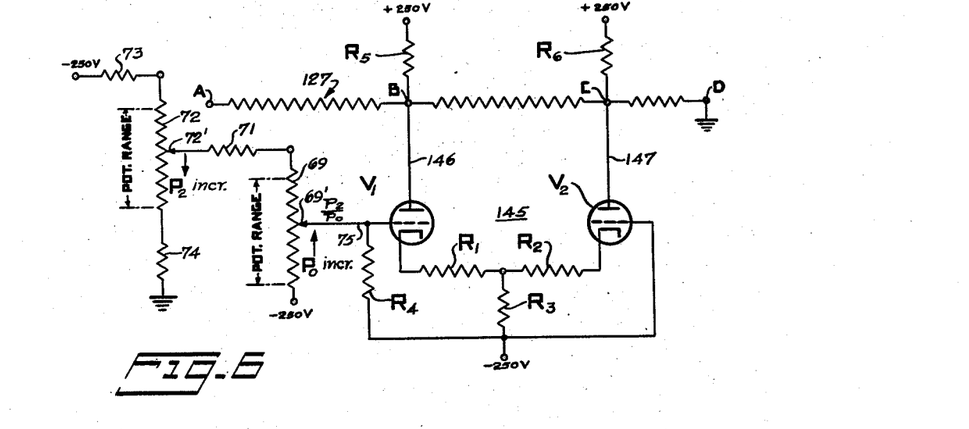
Fig. 6 is an electrical diagram illustrating circuitry for obtaining ram pressure correction.

Fig. 6 illustrates the electric circuitry involved in the ram pressure correction. The relationship between the $P_2$ potentiometer and the $P_0$ potentiometer provides for dividing the factor $P_2$ by the factor $P_0$ so that the derived voltage at the silder of the $P_0$ potentiometer represents for practical purposes the ram pressure ratio $$\frac{P_2}{P_0}$$

As diagrammatically indicated in the simplified drawing of Fig. 6, the $P_2$ and $P_0$ sliders are represented as moving in opposite directions for accomplishing this dividing function. The lower terminal of the $P_0$ potentiometer is connected to a negative D. C. reference voltage ($-250$ v.). The upper terminal of the $P_2$ potentiometer is connected through a resistance to a similar D. C. reference source ($-250$ v.) and the lower terminal of this potentiometer is connected to ground through a comparatively high resistance. Accordingly the potential drop across the potentiometer per se will be a small part of the total impressed voltage, i. e. for example approximately 9 or 10 volts, with the upper terminal being close to the potential of the D. C. supply. It follows therefore that the potential derived at the slider of potentiometer $P_2$, and consequently the potential at the connected upper terminal (as shown) of the potentiometer $P_0$ for all values of $P_2$ falls within a range of, say $-240$ v. to $-249$ v.

For the situation representing a ram pressure ratio of unity, i. e.

$$\frac{P_2}{P_0}=1$$

a predetermined negative voltage representing $$\frac{P_2}{P_0}$$

is derived at the slider of the $P_0$ potentiometer for controlling the ram pressure correction circuits presently described. As will be apparent, there can be a number of combinations of $P_2$ and $P_0$ representing a given ram pressure ratio and the resistance of the above-described potentiometer circuits are designed so that any combination of $P_2$ and $P_0$ representing said given ratio produces a predetermined negative voltage; another predetermined negative voltage that is less negative than the unity ratio voltage is produced for each ram pressure ratio greater than unity.

The negative D. C. voltage on the lower terminal of the $P_0$ potentiometer, it will be noted, is equal to the grid potential on $V_2$ only (−250 v.) in the ram pressure correction circuits. Accordingly, a voltage derived at or near the lower terminal of this potentiometer (representing very high altitude) is practically that of the reference supply voltage −250 v. For such low values of $P_0$ the ram pressure ratio is represented as comparatively large, as in actual flight, and variations in $P_2$ for such very low values of $P_0$ would not materially affect the derived signal voltage representing $$\frac{P_2}{P_0}$$

The signal $$\frac{P_2}{P_0}$$

which may be a negative D. C. voltage ranging from, say −240 v. to −249 v. representing a range from unity to high ram pressure ratios energizes the grid of a triode $V_1$, the anode circuit of which is connected to a positive D. C. source (+250 v.) through a resistance $R_5$. The anode is also connected at terminal B to an intermediate part of the metering function potentiometer (Fig. 2) as indicated. The cathode is connected through resistance $R_1$ and $R_2$ to the cathode of a second triode $V_2$, the anode circuit of which is also connected to a D. C. source (+250 v.) through a resistance $R_6$. The anode is also connected at terminal C to the lower terminal of the metering function potentiometer. The grids of both triodes $V_1$ and $V_2$ are connected to the negative D. C. reference voltage (−250 v.), the connection to the grid of $V_1$ including a resistance $R_4$ and the grid of $V_2$ being directly connected to the negative voltage source. The cathode circuits are also connected to this negative voltage source through a resistance $R_3$ which is connected to the junction of resistances $R_1$ and $R_2$. The resistances $R_4$, $R_5$ and $R_6$ are very high as compared with resistances $R_{AB}$, $R_{BC}$ and $R_{CD}$.

The desired operation of the ram pressure correction circuits will become apparent in connection with the chart of Fig. 4. For example, as the ram pressure ratio $$\frac{P_2}{P_0}$$

increases, the point C on the chart assumes a lower position with respect to the ordinate. This corresponds to the terminal C of the metering function potentiometer of Fig. 6 becoming less negative. The point B on the chart, Fig. 4, stays fixed for the condition in question since this part (A–B) of the curve may be considered substantially linear. In Fig. 6, assuming that the potential $\delta\sqrt{\theta}(1+\alpha)$ at terminal A of the metering function potentiometer remains constant, the potential at point B is maintained constant notwithstanding variations in the $$\frac{P_2}{P_0}$$

signal. Variation of potential at point A results in a corresponding shift of the potential at point B to correspond with the relationship indicated in Fig. 4. In accordance with the chart of Fig. 4, that part of the metering function potentiometer between points A and B is substantially linear whereas the part between points B and C is non-linear.

Ram pressure correction is as follows:

Let it be assumed that the airplane is in level flight so that $P_0$ is constant. Therefore an increase in $P_2$ due to increased airspeed represents an increase in the ratio $$\frac{P_2}{P_0}$$

This corresponds to a decrease of the $$\frac{P_2}{P_0}$$

negative signal which decreases the bias on tube $V_1$, Fig. 6, thereby causing more current to flow through the tube and the cathode circuit resistance $R_3$. The resulting larger potential drop across $R_3$ increases the bias on tube $V_2$, thereby decreasing the current through this tube. This in turn causes the terminal C to become less negative since less current is drawn from the positive supply resulting in a smaller voltage drop across the resistance $R_6$. At this point it should be noted that the large negative voltage drop across the tubes $V_1$ and $V_2$ (which function as generators) in combination with the voltage drop across the resistances $R_5$ and $R_6$ maintain the points B and C at negative potentials.

As the potential at terminal C becomes less negative, (representative of an increase in the ram pressure ratio) the negative current ($i$) through the external resistance $R_{CD}$ between terminals C and D due to the applied voltage at terminal A of the metering function potentiometer is decreased. This causes lowering of the functional characteristics between B and C as desired in accordance with the relationship indicated in Fig. 4.

Since it is also desirable that the negative voltage at terminal B remain constant for a fixed voltage level of $\delta\sqrt{\theta}(1+\alpha)$ at the potentiometer terminal A, the tube $V_1$ must maintain the negative current flowing through $R_{AB}$ constant and equal to the original negative current ($i$) above referred to. This is accomplished by having tube $V_1$ draw more current from the positive plate supply which current is diverted to that part of the potentiometer resistance $R_{AB}$. It will be noted that this resistance is part of the effective load resistance for the tube $V_1$. The new voltage drop in the potentiometer resistance $R_{BC}$ due to a lowering of voltage at terminal C requires a larger current through the resistance $R_{BC}$ than under conditions where $$\frac{P_2}{P_0}=1$$

that is, the tube $V_1$ draws more current since it is subject to less bias by reason of the larger negative signal voltage on its grid. This is the compensating factor which tends to hold the voltage at terminal B at its former value by reason of the increase in loading effect of the potentiometer resistance $R_{BD}$ in turn resulting from lowering of the potential at terminal C. That is, more current is required from potentiometer terminal A due to the lower impedance at $R_{BD}$ so that a self balancing system is provided.

By so controlling the potentials at the points B and C of the metering function potentiometer 127, the derived voltage at slider 127′ represents the corrected fuel signal which is in accordance with the characteristic curves of Figs. 3 and 4.

The corrected fuel signal $W_f$ is fed to the servo power amplifier generally indicated at 39, Figs. 1, 2, the output of which is used to control the valve actuator or motor 40 which in turn through shaft 41 controls the opening of the fuel metering valve 29. In addition to the main input signal $W_f$ there is also a feedback signal on conductor 149 from the rectifier 43b representing the fuel quantity signal from the flow meter tachometer 43a and flow meter 42. The feedback signal is produced like the turbine R. P. M. signal previously described and is a rectified D. C. signal that is opposite in polarity to the $W_f$ signal. The rectified feedback signal, shown as positive, has a linear relation to fuel flow and serves to compensate for variations in the fuel supply pressure and the viscosity of the fuel.

Figure 10:
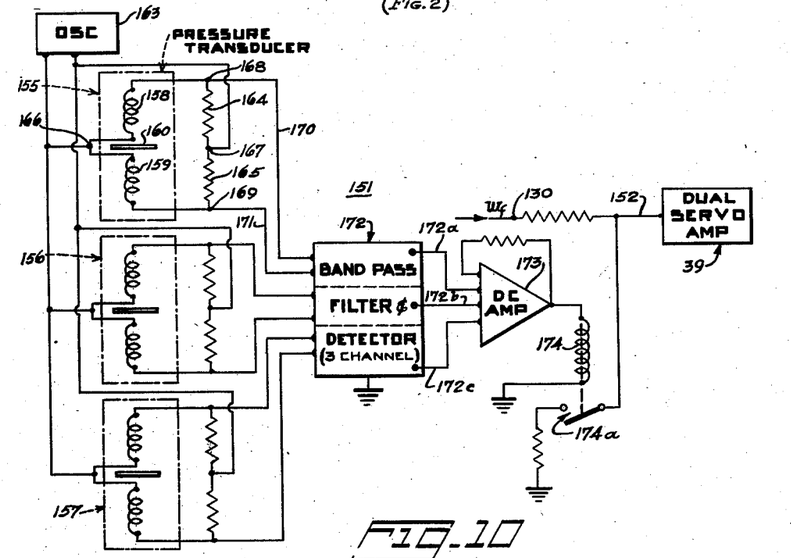
Fig. 10 is a diagrammatic illustration of a "surge" detector system that may be used in the present control system.

Another input for the servo power amplifier may comprise a signal from a "surge" detector generally indicated at 151, an example of which is specifically shown by Fig. 10 presently referred to. The "surge" signal is connected to the amplifier input by conductor 152, the signal being produced only when the compressor stages indicate incipient "surge" and either reducing or being in opposition to the $W_f$ signal so as to cause reduction in the fuel supply according to a predetermined factor of safety.

Figure 11:
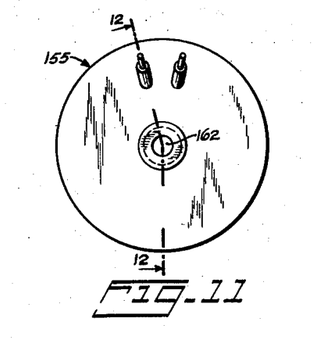
Fig. 11 is an end view of a pressure transducer used in the surge system of Fig. 10.
Figure 12:
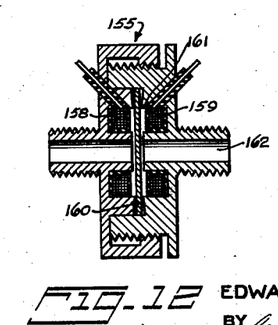
Fig. 12 is a section on the line 12—12 of Fig. 11.

A form of "surge" detector that may be used in the present invention is shown by Figs. 10, 11 and 12. The operative connections between the detector system of Fig. 10 and the gas turbine are indicated in Fig. 1 wherein three pressure pick-offs at different stages of the compressor are used. The pressure at each pick-off point is directed to a suitable sensitive pressure transducer such as shown by Figs. 11 and 12. This pressure transducer is disclosed and claimed in an application Serial No. 327,326 filed December 22, 1952, by E. H. Gamble and L. E. MacFadden for "Pressure Transducer," now abandoned.

Referring to Fig. 10, three pressure transducers of the type shown by Figs. 11 and 12 are diagrammatically indicated at 155, 156 and 157 respectively. The transducer 155 for example, comprises two coils 158 and 159 serially connected as indicated and positioned so as to be magnetically affected by the transverse movement of an interposed metal diaphragm generally indicated at 160. The diaphragm, which is composed of magnetic material is positioned between the coils as shown in Fig. 12 so that vibration of the diaphragm affects the reluctance of the coils in known manner. As described in the aforesaid application the diaphragm is highly sensitive to rapidly fluctuating pressures by reason of the fulcrum mounting at 161 at the diaphragm periphery and also the restricted actionable area of the diaphragm opposite the variable pressure duct, such as duct 162. The other duct may be connected directly to atmosphere.

Referring again to the detector system of Fig. 10, an oscillator 163 such as a 10 k. c. generator is connected to each of three bridge circuits including the coils of a responsive pressure transducer. The bridge circuits are similar and a description of the circuit including the transducer 155 will suffice. The coils 158 and 159 and resistances 164 and 165 comprise the four arms of the bridge, the oscillator being connected across the bridge at the coil junction terminal 166 and the resistance junction terminal 167. The opposite junctions of the bridge at 168 and 169 are connected by conductors 170 and 171 to a channel of a conventional band pass filter and detector generally indicated at 172. The bridge circuits of the other transducers 156 and 157 are similarly connected to responsive channels of the band pass filter and detector as indicated. The responsive channel output of the band pass filter and detector are fed by conductors 172a and 172b and 172c to a D. C. forming amplifier 173 the output of which is connected so as to energize a relay coil 174. The relay contacts indicated at 174a are adapted to be closed upon predetermined energization of the coil 174 so that a ground-resistance circuit conductor is connected as indicated to the $W_f$ input circuit of the dual servo amplifier 39, Fig. 2. It will be apparent that a circuit so established has the effect of reducing the magnitude of the input signal and thereby reducing the amplifier output which controls the fuel valve in accordance with a predetermined factor of safety.

The "surge" detector system operates on the principal of "surge" indication according to the combined effect of pressure variations between stages of the compressor. As above pointed out the sensitive diaphragm of each pressure transducer is deflected by conventional pressure and vibrated according to fluctuations in said pressure thereby varying the flux in the opposing coils by reason of the varying magnetic circuit. In order to operate the relay 174, the D. C. amplifier must produce a predetermined summed voltage which is attained when signals from the surge transducers are sufficiently large. Thus, a surge detection of predetermined magnitude is obtained and the band pass filter is adjusted in well known manner to pass only the stall frequencies, i. e. frequencies which are less than 10 kc. and which are characteristic of the particular jet engines to be controlled.

Referring back to Fig. 2 it will be noted that the output of the dual servo power amplifier 39 energizes a pair of differential coils 40a and 40b which control the valve motor 40.

Figures 2A, 7:
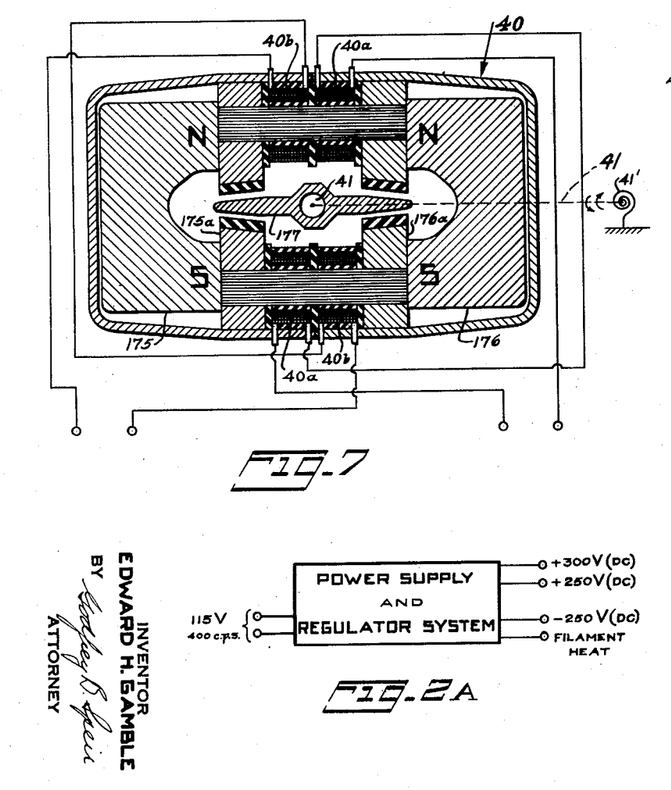
Fig. 2A is a block diagram indicating the type of power supply system for the main control system.
Fig. 7 is a sectional view of the actuator for the fuel metering valve.

Referring now to Fig. 7 which illustrates the valve motor 40, the essential elements of the motor include a pair of permanent magnets 175 and 176 having soft iron pole pieces 175a and 176a respectively positioned in magnetic opposition with respect to each other as indicated. The aforesaid coils 40a and 40b are located between the opposing poles of the responsive magnets. Each coil is formed of two series-connected sections as indicated. A section of each coil is diagonally across from its mate. A butter-fly type armature 177 is pivotally mounted on a shaft generally indicated at 41 so that the armature tips operate within the air gaps formed between the responsive magnetic pole pieces. Each pole piece is tipped with a buffer composed of known non-magnetic material such as rubber for preventing sticking of the armature to the pole pieces. Assuming that the currents in the coils 40a and 40b are equal, it will be apparent that the magnetic forces acting on the armature are balanced so that the armature which is normally spring biased in suitable manner to neutral position as schematically indicated at 41', remains in such position. In practice the spring centering means for the armature comprises a steel torsion tube constituting the shaft of the armature. When the current in one coil predominates over that of the other, the magnetic flux in one gap at a given side of the armature is strengthened whereas the magnetic flux at the opposing magnet gap at the same side of the armature is correspondingly weakened so that a turning force is applied to the armature against the tension of its centering spring. Thus the armature can be rotated through a limited angle in one direction or the other depending on the relative strength of the currents in the coils 40a and 40b. This motor is designed to provide output torque having linear relation to the differential current input, and also to have a wide range of frequency response. For a more detailed description of this type of valve motor, reference is made to my copending application Serial No. 322,063, filed November 22, 1952, for "Linear Torque Motor," now Patent No. 2,718,614, which is assigned to the same assignee as the present invention. The valve motor above described is directly connected through the shaft 41 to the rotary fuel metering valve 29 shown by Figs. 8 and 8a. The rotary valve 29 comprises a spindle 178 connected to the shaft 41 for rotation therewith. The spindle is suitably mounted in the valve housing and is provided with a plurality of peripherally spaced lands 178a extending longitudinally of the spindle axis. The stationary part of the valve comprises a plurality of concentric sleeves 179 and 184 having radial passages formed therein.

Figure 8:
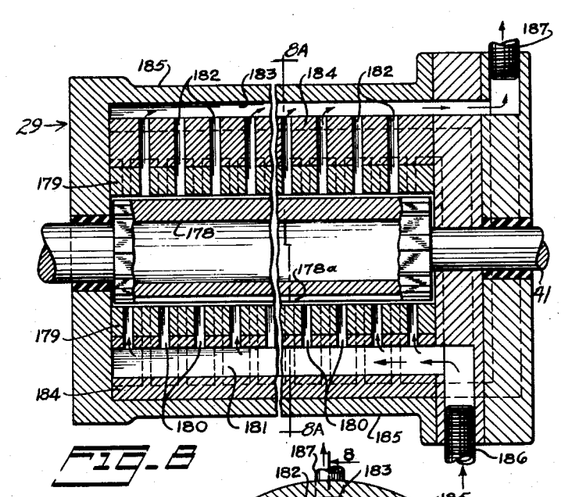
Fig. 8 is a longitudinal sectional view of a fuel metering valve of the rotary type that may be used in the control system and is on the plane 8—8 of Fig. 8A.
Figure 8A:
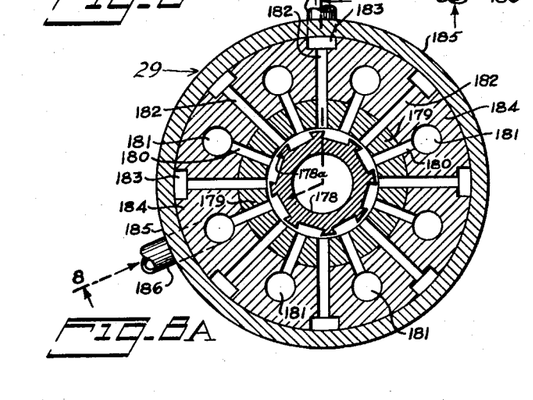
Fig. 8A is a cross-sectional view on the line 8A—8A of the rotary valve of Fig. 8.

An outer sleeve 185 comprises the valve casing. The sleeves 179 and 184 within which the spindle is fitted for close cooperation are provided with a plurality of spaced radial ducts 180 terminating in passages 181 running longitudinally of the valve and communicating with the inlet duct 186. The sleeves 179 and 184 are also provided with ducts 182 terminating in longitudinal passages 183 connecting with the outlet duct 187.

The annular spacing between passages 180 and 182 is ½ the annular spacing between the lands 178a and the spindle 178 may be rotated to a position wherein a fluid passage is established between ducts 180 and 182, thus connecting the inlet and outlet ducts 186 and 187. The position of the spindle which controls this fluid passage determines the amount of fuel flow through the valve. The variable size valve orifice area has nearly linear relation to the angular displacement of the valve spindle. This valve, although very compact in design, is capable of precisely metering the fuel flow according to the servo demand and is adapted to control comparatively large quantities of jet engine fuel at high pressure. For a more specific description of this type of fuel metering valve, reference is made to a copending application Serial No. 323,179 filed November 29, 1952, by Elwyn Peters for "Rotary Hydraulic Valve," and assigned to the same assignee as the present invention.

Figure 9:
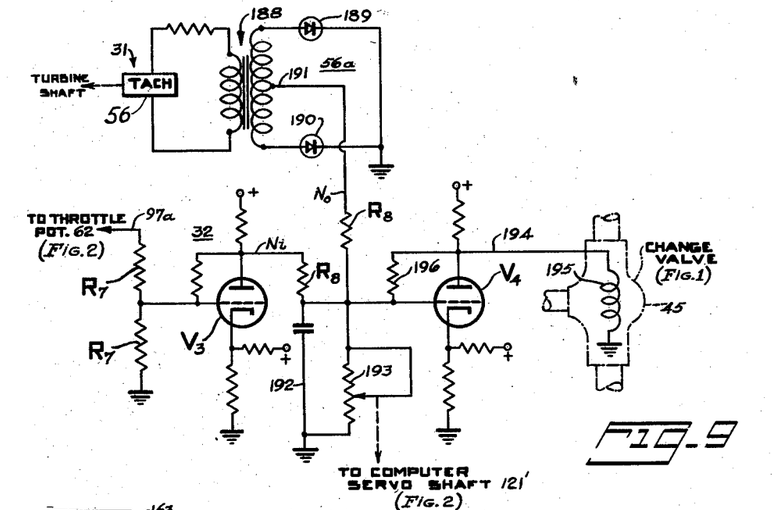
Fig. 9 is an electrical diagram of the tachometer circuit and solenoid change valve with fail-safe provision.

It will be apparent that certain fail-safe features are required in the practical operation of the control system of the present invention, particularly where primary control features are involved such as the tachometer voltage $N_o$ representing turbine speed. A fail-safe system for operating the change valve 45, Fig. 1, in case of tachometer failure is shown in Fig. 9. The tachometer generally indicated at 56 generates an A. C. voltage as previously described, the amplitude of which is proportional to the turbine speed. The tachometer is connected through a transformer 188 to a rectifying system generally indicated at 56a including a pair of diode rectifier tubes 189 and 190. A conductor 191 is connected to a center tap of the transformer secondary for obtaining full wave rectification of the voltage representing $N_o$. This voltage is used as presently described in connection with the voltage $N_i$ representing throttle position for controlling the change valve.

For producing a voltage $N_i$ of proper polarity, the slider contact 62′ of the throttle potentiometer 62 is connected by conductor 97a to a voltage divider comprising two resistances $R_7$ of equal value. The voltage at the center tap representing $N_i$ is fed to the control grid of a triode $V_3$ having a feed-back connection as indicated. The anode circuit voltage $-N_i$ has reversed polarity and this voltage is fed through resistance $R_8$ to the control grid of a second triode $V_4$, which also has a feed-back circuit including a resistance 196 as indicated. The grid of tube $V_4$ is also connected to the rectified voltage $N_o$ through a resistance $R_8$. The feed-back resistance 196 is so adjusted that for the condition when $N_o$ is zero, the voltage $N_i$ is sufficient to cause material current flow through the tube. When $N_i$ equals $N_o$ the tube $V_4$ passes no current. The anode circuit of tube $V_4$ is connected by conductor 194 to a solenoid coil 195 of the change valve which is operatively related in a suitable manner to the movable valve element (not shown) in the system so far described.

The tube $V_4$ is adapted to pass current for operating the change valve whenever $N_o$ is zero and a voltage $N_i$ exists. In order to prevent operation of the change valve during the turbine starting period when $N_o$ is zero or substantially so, a time delay circuit is connected to the control grid of tube $V_4$ comprising a conductor 192 and a variable resistance 193 connected in parallel. As illustrated the resistance 193 is varied according to the position of the computer servo so that the time delay in transmitting voltage in $N_i$ to the tube depends on the fuel demand as well as the time constants and tube bias. In addition to operating the solenoid change valve, the output current of tube $V_4$ may also operate a suitable solenoid switch in the emergency system for deenergizing the electric control.

Other fail-safe features may involve the servo amplifier 39 which may be connected in any suitable manner to the change valve 45 so as to cause operation of this valve in the event of failure of any voltage limiting circuits in said amplifier.

The computer servo amplifier 103 as previously mentioned provides for a direct line of signal transmission through the amplifier and has a second signal input for a feed-back signal so as to be utilized for closed-loop servo operation. The output has a 400 C. P. S. current for energizing the control winding of the servo motor 121. This amplifier is separately claimed and fully described in my copending application Serial No. 352,135, filed April 30, 1953, for "Amplifier Apparatus," now abandoned, which is assigned to the same assignee as the present invention.

The dual servo power amplifier 39 for energizing the valve motor 40 is provided with two alternative channels of transmission in case of failure of one of the channels; normally a first channel is used for transmission. In case of failure of this first channel, means are provided for automatically switching to a second channel; in case of failure of transmission in the second channel an emergency control system may be switched in. In this amplifier the output is single ended and a D. C. voltage output is provided that is linear with the D. C. signal input. Desirable characteristics include provision for velocity control of the servo by using an A. C. amplifier of adjustable gain which may directly affect the D. C. voltage transmission level. This amplifier is separately claimed in my copending application Serial No. 352,136 filed Apr. 30, 1953, for Servo Power Amplifier Apparatus which is assigned to the same assignee as the present invention.

*Operation of the system*

The computing and control system above described operates automatically in accordance with certain flight and engine control factors previously indentified in combination with a single manual control, namely the throttle adjusted by the pilot in accordance with desired engine speed. Referring to Fig. 2, assuming that the throttle lever 35 is moved from some initial position to a second angular position, the slider contact 62′ of the $N_i$ potentiometer 62 is correspondingly moved to the same angle. The voltage now existing between the slider and electrical ground at 65 is proportional to the total angular displacement of the throttle and corresponds to the newly desired turbine speed. This voltage, which represents $2N_i$ for computing purposes, is fed to the circuit junction 99 connected also to the rectifier circuit of the engine tachometer 56 so as to be opposed by a voltage opposite in polarity corresponding in amplitude to the actual initial speed of the turbine. The aforesaid voltages are algebraically summed at the junction 99 across resistances 98 and 95, respectively, and the resultant voltage representing $(2N_i - N_o)$ is applied across the $P_3$ pressure transducer potentiometer 96. Accordingly, the voltage between the slider 96′ and electrical ground at this transducer is $(2N_i - N_o)P_3$, the potentiometer arm being displaced in accordance with $P_3$ thereby providing a multiplication of the voltage fed to the potentiometer by reason of the linear relation between potentiometer displacement and the pressure at $P_3$ in the turbine. When $N_o$ approaches $N_i$ an average value $N$ may be considered to represent the quantity $(2N_i-N_o)$ so that the voltage signal may be designated $NP_3$. This voltage constitutes previously noted basic electric signal input for the computer servo amplifier 103.

A proper time delay is introduced in the transmission of the throttle derived signal voltage $2N_i$ by means of the acceleration-deceleration limiter condenser 135 and series-connected variable potentiometer resistance 128. For example, let it be assumed that the pilot rapidly opens the throttle calling for higher turbine speed, thereby producing a high rate of increase in voltage $2N_i$. If no time delay means were provided, the voltage $2N_i$ having now an instantaneous value much higher than the lagging turbine speed voltage $N_o$ would cause too rapid opening of the fuel valve for proper acceleration of the turbine up to the new speed setting. The time delay circuit above described serves to retard the rapid increase of voltage $2N_i$ so that the turbine is more moderately accelerated within tolerated temperature limits as the fuel valve is further opened. Conversely, rapid closing of the throttle calling for deceleration also serves to limit the rate of decrease of voltage $2N_i$ as transmitted to the control system so that closing of the valve is gradual rather than abrupt. Furthermore, by reason of the servo-adjusted potentiometer resistance 128, the aforesaid time delay is regulated in accordance with the instantaneous operating condition of the turbine. That is, when the servo is calling for near-maximum fuel (hence large values of $$\frac{NP_3}{\delta\sqrt{\theta}}$$

involving both large inertia forces and high turbine temperatures), the time constant is large since gradual change in fuel input is more important in this high-temperature range of operation.

The output of the computer servo amplifier operates the servo motor 121 in the manner above described to position the slider 127' of the metering function potentiometer 127. The contour or resistance distribution of this potentiometer is in accordance with the desired metering function. Since a dividing servo, rather than a proportional servo is here involved the servo shaft 121' is not displaced directly proportional to $NP_3$ but is also affected by the voltage from the feedback potentiometer 126 which is energized by the voltage $\delta\sqrt{\theta}$. Accordingly, the output of the computer servo displaces the servo shaft and associated potentiometer sliders to an angle proportional to $NP_3/\delta\sqrt{\theta}$, thereby functioning as a dividing servo mechanism. Accordingly, the displacement of the metering function potentiometer is according to this same factor as specified above in connection with the desired analysis and metering function.

The voltage $\delta\sqrt{\theta}$ fed to the feedback potentiometer 126 represents the product of turbine inlet pressure and temperature and, as previously described, is obtained from the $P_2$ temperature resistance probe 84 in combination with the $P_2$ potentiometer 76. Since a multiplying circuit is involved the voltage derived at slider 76' represents $\delta\sqrt{\theta}$, the potentiometer 76 being linear with respect to $P_2$. This voltage which is negative in polarity is fed to the D. C. summing amplifier 78 which reverses the polarity thereby providing the voltage $+\delta\sqrt{\theta}$ as the signal for energizing the servo feedback potentiometer 126.

The energizing voltage for the metering function potentiometer 127 is produced so as to represent the corrected maximum fuel metering function signal $$[-W_{f_{max}}\delta\sqrt{\theta}(1+\alpha)]$$

To this end three voltages are summed at the input of the D. C. amplifier 140, one voltage being the output $+\delta\sqrt{\theta}$ of the first D. C. amplifier 78. The other two voltages are from the throttle potentiometer assembly, namely a voltage $+\delta\sqrt{\theta}N_i^2$ from throttle potentiometer 64 and a voltage $-\delta\sqrt{\theta}N_i^2/\theta$ from the throttle potentiometer 63. These potentiometers are both energized by pressure-temperature voltages from the $P_2$ resistance probe 83 and the D. C. amplifier 78 as previously described. The polarity of the third input voltage is reversed in known manner by feeding this voltage into the inner grid of the first stage of the D. C. amplifier 140. Accordingly, the summed output of the D. C. amplifier 140 provides the metering function potentiometer with a signal voltage corresponding to the desired fuel metering function ordinate corrected in accordance with the fuel metering correction characteristics as described in connection with Fig. 3. The derived voltage therefore at the slider 127' of the metering function potentiometer corresponds to $W_f$ corrected so that servo controller is fed by a signal voltage corresponding to the corrected fuel flow $W_f$.

As above described in connection with Figs. 4 and 6, a further correction for ram pressure ratio is made in accordance with the selected fuel metering function using the $P_0$ and $P_2$ pressure transducers to produce a voltage representing the ram pressure ratio $$\frac{P_2}{P_0}$$

This voltage is fed from $P_0$ potentiometer 69 to the ram pressure correction circuits of Fig. 6 as previously described for controlling the voltage at the tap B of the metering function potentiometer so as to provide for proper change in the corrected $W_f$ signal voltage with changes in ram pressure ratio. As will be evident from Fig. 4, ram pressure ratio changes are taken into account only within the region in which there is a material effect due to such changes.

The corrected fuel signal voltage $W_f$ from the metering function potentiometer 127 serves as the major input to one channel of the dual servo amplifier 39, the output of which is a D. C. current feeding one of the windings, such as winding 40a, of the valve motor 40 shown in Fig. 7. The other winding 40b is fed with a fixed D. C. current. The resulting variable differential current resulting from the varying magnitude of the current in winding 40a causes the armature 177 of the valve motor to rotate through an angle that is proportional to the differential current so as to produce an output torque that is linear in relation to the angular displacement of the armature. The torque motor shaft 41 which is directly mechanically connected to the valve spindle of the fuel metering valve 29, Fig. 8, produces a corresponding displacement of the spindle for varying the fuel orifice area as above pointed out. A metering function of the valve is insured by reason of the D. C. feedback signal generated by the flowmeter 42 which is connected in the path of the metered fuel, providing a feedback signal to the servo power amplifier that is proportional to the actual flow through the valve. This feedback signal is opposite in polarity to the corrected fuel signal $-W_f$ so that the output of the servo power amplifier is dependent upon the actual flow through the metering valve thereby providing correction for variations in the fuel supply pressure and in varying viscosity of the fuel.

It will, therefore, be seen that the fuel metering control system of the present invention involves the following basic operations: (a) computation of the corrected fuel flow on the basis of estimated engine performance data, and (b) correction of fuel flow for proper scheduling by means of feedback control provided by the flowmeter tachometer. It will also be seen that the fuel control system of the present invention provides for basic control factors including proficiency of the compressor (pressure at $P_3$), the diffuser pressure increase (pressure at $P_2$) and both the compressor input temperature at $P_2$ and the turbine inlet temperature at $P_4$. The system also provides for fuel metering correction which varies with $N^2$ and $$\frac{1}{\theta}$$

according to characteristic data analysis. In addition to accurate metering of fuel for providing stable operation of the turbine for widely varying conditions of ambient temperatures and pressure, airspeed and turbine temperature, also taking into account the operating condition of the jet engine, the control system has a comparatively fast response, the computer part of the system and servo-valve controller having a calculated inherent time constant of approximately 50 milliseconds.

Certain modifications of the present control system may be made within the scope of the invention. For example, the high frequency performance characteristics of the servo controller and valve motor may be utilized for producing even further reduction in the time constant of the system. This may be done by providing an A. C. voltage of a fixed frequency, the amplitude being determined according to the computed value of $W_f$ and providing push-pull output for the normal operating channel of the servo power amplifier so that the valve motor is continuously oscillated about its center or null position. It will be apparent that the flowmeter will respond as before to the integrated fuel flow, thereby insuring accurately metered flow.

The invention also contemplates the use of alternate apparatus in place of electronic units where the use of electronic units in air-borne control apparatus is considered objectionable. For example, transistor or magnetic amplifiers, known in the art, are satisfactory as alternates for the electronic amplifiers of the control system. In such case, the computer servo amplifier would be replaced by a push-pull magnetic amplifier in combination with an inductor motor responsive thereto for controlling the metering function potentiometer. Changes in the voltage signal level at the input to the computer servo magnetic amplifier are obviously within the scope of the computer system. The D. C. summing amplifiers 78 and 140 also could be replaced with comparatively small magnetic amplifiers and the dual servo amplifier 39 could be replaced by a slightly larger magnetic amplifier for driving the valve motor 40. Certain advantages of the magnetic amplifier over electronic amplifiers include high resistance to vibration and shock within a fairly wide operating range; also the use of magnetic amplifiers eliminates the need for a highly regulated voltage supply for the signal and plate voltages of electronic amplifiers. A disadvantage of magnetic amplifiers is that the time constants of the circuits involved are larger than those in corresponding electronic circuits as shown in the present system.

It may be noted that the dual amplifier 39, providing automatic switching from one amplifier to another, includes another aspect of fail safety, in that one amplifier adjusts the valve motor in opposite rotational sense from the other. For instance, sticking of valve 29 on one amplifier channel causes channel switching, whereupon the valve motor exerts torque on the valve to move it to another position, different from that which it occupied but calling for correct fuel flow.

Though a single embodiment of the invention is shown, it is to be understood that the invention may be applied in other forms and in various environments. Changes may be made in the arrangements shown without departing from the spirit of the invention. Reference should be had to the appended claims for definition of the limits of the invention.

What is claimed is:
1. A control system for regulating the fuel supply to a gas turbine and compressor combination comprising voltage deriving means for producing potential in accordance with the operation of a throttle control, electrical means for producing potential representing the speed of the turbine and compressor combination, a second voltage deriving means operable by pressure responsive means that is responsive to the compressor discharge pressure, said second deriving means being energized by potential representing the difference between said throttle and turbine potentials for producing a fuel control potential, servo motor means operable by and according to the sense and magnitude of said control potential, fuel valving means operated by said servo motor for controlling the fuel supply to the turbine, and feedback means including flow responsive means in the fuel supply line for generating a feedback potential connected to and controlling said servo motor means.

2. A control system for regulating the fuel supply of a gas turbine engine having a compressor, comprising means for deriving a control quantity representing the fuel flow required to maintain a desired engine speed and including any difference between actual and desired turbine speed, means to sense compressor discharge pressure, means operated by said sensing means to modify said control quantity, a servo motor energized by said modified control quantity according to the sense and magnitude thereof, control means for the flow of fuel to said engine actuated by said servo motor, means to sense actual fuel flow, means to compare actual fuel flow with desired fuel flow according to the modified control quantity, and means to modify the action of said servo motor in accordance with fuel flow error.

3. A control system for regulating the fuel supply of a gas turbine engine having a compressor, comprising means for deriving a control quantity representing the fuel flow required to maintain a desired engine speed and including any difference between actual and desired turbine speed, means to sense compressor discharge pressure, means operated by said sensing means to modify said control quantity, a servo motor energized by said modified control quantity according to the sense and magnitude thereof, control means for the flow of fuel to said engine actuated by said servo motor, means sensitive to incipient surge of airflow through the compressor, and means actuated by said surge sensitive means to limit fuel flow to a value less than that called for by said control quantity.

4. A control system for the fuel supply of a gas turbine engine including serially, a compressor, a burner to which fuel is fed and a turbine driving the compressor, comprising a throttle control adjustable to select a plurality of power levels, selectors operated by said control to select proportional controlled quantities representing turbine speed, compressor pressure rise, ram pressure and ram temperature, sensing means for actual quantities of turbine speed, compressor pressure rise, ram pressure and temperature, means respectively responsive to differences between controlled and actual quantities productive of a fuel feed error signal, and motor means actuated by said signal to correct fuel feed to the engine, a fuel flowmeter measuring actual fuel flow, and a feedback from said flowmeter to said fuel feed corrector.

5. A control system for the fuel supply of a gas turbine engine including serially, a compressor, a burner to which fuel is fed and a turbine driving the compressor, comprising a throttle control adjustable to select a plurality of power levels, selectors operated by said control to select proportional controlled quantities representing turbine speed, compressor pressure rise, ram pressure and ram temperature, sensing means for actual quantities of turbine speed, compressor pressure rise, ram pressure and temperature, means respectively responsive to differences between controlled and actual quantities productive of a fuel feed error signal, motor means actuated by said signal to correct fuel feed to the engine, a fuel flowmeter measuring actual fuel flow, and a feedback from said flowmeter to said fuel feed corrector, means sensitive to a maximum permissive turbine temperature, means sensitive to incipient compressor surge, and means actuated by said two sensitive means upon operation thereof to limit fuel feed to the engine.

6. A control system for the fuel supply of a gas turbine engine including serially, a compressor, a burner to which fuel is fed and a turbine driving the compressor, comprising a throttle control adjustable to select a plurality of power levels, selectors operated by said control to select proportional controlled quantities representing turbine speed, compressor pressure rise, ram pressure and ram temperature, sensing means for actual quantities of turbine speed, compressor pressure rise, ram pressure and temperature, means respectively responsive to differences between controlled and actual quantities productive of a fuel feed error signal, motor means actuated by said signal to correct fuel feed to the engine, a fuel flowmeter measuring actual fuel flow, and a feedback from said flowmeter to said fuel feed corrector, said several means comprising electrical voltages, and said motor means being actuated by the combined voltages.

7. A control system for the fuel supply of a gas turbine engine including serially, a compressor, a burner to which fuel is fed and a turbine driving the compressor, comprising a throttle control adjustable to select a plurality of power levels, selectors operated by said control to select proportional controlled quantities representing turbine speed, compressor pressure rise, ram pressure and ram temperature, sensing means for actual quantities of turbine speed, compressor pressure rise, ram pressure and temperature, means respectively responsive to differences between controlled and actual quantities productive of a fuel feed error signal, motor means actuated by said signal to correct fuel feed to the engine, a fuel flowmeter measuring actual fuel flow, and a feedback from said flowmeter to said fuel feed corrector, means sensitive to a maximum permissive turbine temperature, means sensitive to incipient compressor surge, and means actuated by said two sensitive means upon operation thereof to limit fuel feed to the engine, said several means comprising electrical voltages, and said motor means being actuated by the combined voltages.

8. A control system for regulating the fuel supply to a gas turbine and compressor combination comprising voltage deriving means for producing potential in accordance with the operation of a throttle control electrical means for producing potential representing the speed of the turbine and compressor combination, a second voltage deriving means operable by pressure responsive means that is responsive to the compressor discharge pressure, said second deriving means being energized by potential representing the difference between said throttle and turbine potentials for producing a fuel control potential, servomotor means operable according to the sense and magnitude of said control potential, fuel valving means responsive to said servomotor for controlling the fuel supply to the turbine, and feedback means including flow responsive means in the fuel supply line for generating a feedback potential for controlling said servomotor means, and means responsive to incipient compressor surge productive of a voltage, connected to modify said fuel control potential.

9. A control system for regulating the fuel supply to a gas turbine and compressor combination comprising voltage deriving means for producing potential in accordance with the operation of a throttle control electrical means for producing potential representing the speed of the turbine and compressor combination, a second voltage deriving means operable by pressure responsive means that is responsive to the compressor discharge pressure, said second deriving means being energized by potential representing the difference between said throttle and turbine potentials for producing a fuel control potential, servomotor means operable according to the sense and magnitude of said control potential, fuel valving means responsive to said servomotor for controlling the fuel supply to the turbine, and feedback means including flow responsive means in the fuel supply line for generating a feedback potential for controlling said servomotor means, and means responsive to attainment of maximum permissive turbine temperature productive of a voltage, connected to modify said fuel control potential.

10. A control system for regulating the fuel supply to a gas turbine and compressor combination comprising voltage deriving means for producing potential in accordance with the operation of a throttle control electrical means for producing potential representing the speed of the turbine and compressor combination, a second voltage deriving means operable by pressure responsive means that is responsive to the compressor discharge pressure, said second deriving means being energized by potential representing the difference between said throttle and turbine potentials for producing a fuel control potential, servomotor means operable according to the sense and magnitude of said control potential, fuel valving means responsive to said servomotor for controlling the fuel supply to the turbine, and feedback means including flow responsive means in the fuel supply line for generating a feedback potential for controlling said servomotor means, and means responsive to rate of change of throttle position to limit rate of change of said fuel control potential.

11. A control system for regulating the fuel supply to a gas turbine and compressor combination comprising voltage deriving means for producing a potential in accordance with the operation of a throttle control, electrical means for producing potential representing the speed of the turbine and compressor combination, a second voltage deriving means operable by pressure responsive means that is responsive to the compressor discharge pressure, said second deriving means being energized by potential representing the difference between said throttle and turbine potentials for producing a fuel control potential, servomotor means operable according to the sense and magnitude of said control potential, and fuel valving means actuated by said servomotor for controlling the fuel supply to the turbine, and feedback means including flow responsive means in the fuel supply line for generating a feedback potential for controlling said servomotor means.

12. In a fuel control system for a compressor-turbine engine, a source of fuel, means adjustable to pass different quantities of fuel from said source to said engine, means to adjust said adjustable means adapted to receive a fuel-desired signal for operating same, computing means responsive to engine speed and compressor pressure productive of a fuel-desired signal and connected to actuate said adjusting means, means to sense incipient compressor surge and productive of a surge signal, and means to combine said surge signal with said fuel-desired signal to limit the action of said adjusting means, to adjust said valve for less than the quantity called for by said fuel-desired signal.

13. In a fuel control system for a compressor-turbine engine, a source of fuel, means adjustable to pass different quantities of fuel from said source to said engine, means to adjust said adjustable means adapted to receive a fuel-desired signal for operating same, computing means responsive to engine speed and compressor pressure productive of the fuel-desired signal and connected to actuate said adjusting means, means to sense actual fuel quantity passed by said adjusting means, comparison means fed by said fuel-desired signal and by said sensing means productive of a fuel quantity error signal, means to impose said error signal on said adjusting means to correct the error in said fuel quantity, means to sense incipient compressor surge productive of a surge signal, and means to impose said surge signal on said adjusting means to limit the action thereof and to adjust said valve for less than the quantity called for by said fuel-desired signal.

14. In a fuel control system for a compressor-turbine engine, a source of fuel, means adjustable to pass different quantities of fuel from said source to said engine, means to adjust said adjustable means adapted to receive a fuel-desired signal for operating same, computing means responsive to engine speed and compressor pressure productive of a fuel-desired signal and connected to actuate said adjusting means, means to sense incipient compressor surge and productive of a surge signal, and means to apply the surge signal to operate the engine toward a condition where surge development is inhibited.

15. In a fuel control system for a turbine engine having a multi-stage compressor driven by the turbine, means adjustable to pass different amounts of fuel to the engine, computing means responsive to engine speed and compressor pressure productive of a fuel-desired signal, means responsive to said signal to actuate said adjustable means, a pressure-sensitive device disposed to sense pressure and pressure fluctuations of the compressed fluid in an intermediate stage of said compressor, a device responsive to pressure fluctuations and not to steady-state pressure sensed by said device and producing a surge signal upon pressure fluctuations, and means actuated by said surge signal to modify the adjustment of said adjustable means to pass less fuel to said engine.

16. In a fuel control system for a turbine engine having a multi-stage compressor driven by the turbine, means adjustable to pass different amounts of fuel to the engine, computing means responsive to engine speed and compressor pressure productive of a fuel-desired signal, means responsive to said signal to actuate said adjustable means, a pressure-sensitive device disposed to sense pressure and pressure fluctuations of the compressed fluid in an intermediate stage of said compressor, a device responsive to pressure fluctuations and not to steady-state pressure sensed by said device and producing a surge signal upon pressure fluctuations, and means actuated by said surge signal to modify an operating condition of said engine to inhibit compressor surge continuation.

17. A control system for regulating the fuel supply to a gas turbine and compressor combination comprising a fuel valve, actuating means therefor, and computing means for controlling said actuating means comprising means for deriving electrical control quantities representing respectively ambient pressure, compressor inlet pressure and temperature, compressor discharge pressure and turbine inlet temperature, means for deriving electrical control quantities representing throttle position, means for deriving an electrical control quantity representing turbine speed, means for combining and comparing the aforesaid electrical control quantities for producing a control quantity representing corrected fuel supply, and means for controlling said actuating means according to the sense and magnitude of said last-named control quantity.

18. In a fuel control system for a compressor-turbine engine, a source of fuel, means adjustable to pass different quantities of fuel from said source to said engine, means to adjust said adjustable means adapted to receive a fuel-desired signal for operating same, computing means responsive to speed error between actual and a desired speed and a plurality of engine temperature and pressure values at different parts of the engine, said computing means producing a fuel-desired signal and connected to actuate said adjusting means, means to sense actual fuel quantity passed by said adjustable means, comparison means fed by said fuel desired signal and by said sensing means productive of a fuel quantity error signal, and means to impose said error signal on said adjusting means to correct the error in quantity.

19. In a fuel control system for a compressor-turbine engine, a source of fuel, means adjustable to pass different quantities of fuel from said source to said engine, means to adjust said adjustable means adapted to receive a fuel-desired signal for operating same, computing means responsive to speed error between actual and a desired speed and a plurality of engine temperature and pressure values at different parts of the engine, said computing means producing a fuel-desired signal and connected to actuate said adjusting means, means to sense incipient compressor surge and productive of a surge signal, and means to combine said surge signal with said fuel-desired signal to limit the action of said adjusting means, to adjust said adjustable means for less than the fuel quantity called for by said fuel-desired signal.

20. In a fuel control system for a compressor-turbine engine, a source of fuel, means adjustable to pass different quantities of fuel from said source to said engine, means to adjust said adjustable means adapted to receive a fuel-desired signal for operating same, computing means responsive to speed error between actual and a desired speed and a plurality of engine temperature and pressure values at different parts of the engine, said computing means producing the fuel-desired signal and connected to actuate said adjusting means, means to sense actual fuel quantity passed by said adjustable means, comparison means fed by said fuel-desired signal and by said sensing means productive of a fuel quantity error signal, means to impose said error signal on said adjusting means to correct the error in fuel quantity, means to sense incipient compressor surge productive of a surge signal, and means to impose said surge signal on said adjusting means to limit the action thereof and to adjust said adjusting means for less than the fuel quantity called for by said fuel-desired signal.

21. In a fuel control system for a compressor-turbine engine, a source of fuel, means adjustable to pass different quantities of fuel from said source to said engine, means to adjust said adjustable means adapted to receive a fuel-desired signal for operating same, computing means responsive to engine speed and compressor pressure productive of a fuel-desired signal and connected to actuate said adjusting means, means to sense actual fuel quantity passed by said adjustable means, comparison means fed by said fuel-desired signal and by said sensing means productive of a fuel quantity error signal, means to impose said error signal on said adjusting means to correct the error in fuel quantity passed by said adjustable means, and means to sense turbine temperature productive of a turbine temperature signal and connected to said computing means to limit the fuel-desired signal therefrom in accordance with turbine temperature.

22. In a fuel control system for a compressor-turbine engine, a source of fuel, means adjustable to pass different quantities of fuel from said source to said engine, means to adjust said adjustable means adapted to receive a fuel-desired signal for operating same, computing means responsive to engine speed and compressor pressure producing a fuel-desired signal and connected to actuate said adjusting means, means to sense incipient compressor surge and productive of a surge signal, means to combine said surge signal with said fuel-desired signal to limit the action of said adjusting means, to adjust said adjusting means for less than the fuel quantity called for by said fuel-desired signal, means to sense turbine temperature productive of a turbine temperature signal and connected to said computing means to limit the fuel-desired signal therefrom in accordance with turbine temperature.

23. In a fuel control system for a compressor-turbine engine, a source of fuel, means adjustable to pass different quantities of fuel from said source to said engine, means to adjust said adjustable means adapted to receive a fuel-desired signal for operating same, computing means responsive to engine speed and compressor pressure, said computing means producing the fuel-desired signal and connected to actuate said adjusting means, means to sense actual fuel quantity passed by said adjustable means, comparison means fed by said fuel-desired signal and by said sensing means productive of a fuel quantity error signal, means to impose said error signal on said adjusting means to correct the error in fuel quantity, means to sense incipent compressor surge productive of a surge signal, means to impose said surge signal on said adjusting means to limit the action thereof and to adjust said adjusting means for less than the fuel quantity called for by said fuel-desired signal, means to sense turbine temperature productive of a turbine temperature signal and connected to said computing means to limit the fuel-desired signal therefrom in accordance with turbine temperature.

References Cited in the file of this patent

UNITED STATES PATENTS

| | | |
|---|---|---|
| 2,179,628 | Heinzelmann | Nov. 14, 1939 |
| 2,557,526 | Bobier | June 19, 1951 |
| 2,581,275 | Mock | Jan. 1, 1952 |
| 2,589,074 | Goodwin | Mar. 11, 1952 |
| 2,623,354 | Best | Dec. 30, 1952 |
| 2,643,513 | Lee | June 30, 1953 |
| 2,649,686 | Lawrence et al. | Aug. 25, 1953 |
| 2,691,268 | Prentiss | Oct. 12, 1954 |
| 2,694,900 | Brandau | Nov. 23, 1954 |
| 2,720,751 | Kunz | Oct. 18, 1955 |
| 2,805,546 | Lawry et al. | Sept. 10, 1957 |